United States Patent
Sussman et al.

(10) Patent No.: US 10,065,316 B2
(45) Date of Patent: Sep. 4, 2018

(54) SYSTEMS AND METHODS FOR SAFE ROBOT OPERATION

(71) Applicants: Michael Sussman, Winchester, MA (US); Michael Guay, Boston, MA (US); Anthony Robson, Boston, MA (US); James Sirois, Boston, MA (US)

(72) Inventors: Michael Sussman, Winchester, MA (US); Michael Guay, Boston, MA (US); Anthony Robson, Boston, MA (US); James Sirois, Boston, MA (US)

(73) Assignee: RETHINK ROBOTICS, INC., Boston, MA (US)

( * ) Notice: Subject to any disclaimer, the term of this patent is extended or adjusted under 35 U.S.C. 154(b) by 26 days.

(21) Appl. No.: 15/017,099

(22) Filed: Feb. 5, 2016

(65) Prior Publication Data
US 2017/0225331 A1    Aug. 10, 2017

(51) Int. Cl.
*B25J 9/16* (2006.01)
*B25J 19/06* (2006.01)
*B25J 13/08* (2006.01)

(52) U.S. Cl.
CPC ........... *B25J 9/1676* (2013.01); *B25J 9/1674* (2013.01); *B25J 19/06* (2013.01); *B25J 13/085* (2013.01); *B25J 13/086* (2013.01); *G05B 2219/39091* (2013.01); *G05B 2219/40202* (2013.01); *G05B 2219/40203* (2013.01); *G05B 2219/43202* (2013.01)

(58) Field of Classification Search
CPC ........ B25J 9/1676; B25J 9/1674; B25J 19/06; B25J 13/086; B25J 13/085; G05B 2219/40202; G05B 2219/40203; G05B 2219/39091; G05B 2219/40559; G05B 2219/43202; G05B 2219/40198
See application file for complete search history.

(56) References Cited

U.S. PATENT DOCUMENTS

| | | | |
|---|---|---|---|
| 9,043,025 B2 | 5/2015 | Brooks et al. | |
| 2006/0049939 A1* | 3/2006 | Haberer | F16P 3/142 340/541 |
| 2010/0191372 A1 | 7/2010 | Nihei et al. | |
| 2010/0198365 A1* | 8/2010 | Kawabata | G01S 7/4812 700/12 |
| 2012/0061155 A1 | 3/2012 | Berger et al. | |
| 2012/0130541 A1* | 5/2012 | Szalek | B25J 9/106 700/258 |
| 2013/0338829 A1* | 12/2013 | Schlaich | B25J 9/1676 700/253 |
| 2013/0345874 A1* | 12/2013 | Blumberg | B25J 9/0087 700/259 |

(Continued)

FOREIGN PATENT DOCUMENTS

| | | |
|---|---|---|
| DE | 102013019450 | 5/2015 |
| JP | 2004243427 | 9/2004 |
| WO | 2009155948 | 12/2009 |

*Primary Examiner* — Jason Holloway
(74) *Attorney, Agent, or Firm* — Morgan, Lewis & Bockius LLP (57) ABSTRACT

In various embodiments, safe robot operation is achieved by combining commercial, off-the-shelf, safety-rated components with the inherent safety-design mechanism of the robot to provide various allowable power levels to robotic actuators and thereby limit the forces and/or speeds generated by robotic appendages driven by the actuators.

9 Claims, 7 Drawing Sheets

(56) References Cited

U.S. PATENT DOCUMENTS

| | | |
|---|---|---|
| 2014/0018958 A1 | 1/2014 | Ueno et al. |
| 2014/0025204 A1* | 1/2014 | Schlaich ............... B25J 9/1676 700/255 |
| 2014/0067121 A1* | 3/2014 | Brooks ................ B25J 9/1676 700/255 |

* cited by examiner

SYSTEMS AND METHODS FOR SAFE ROBOT OPERATION

TECHNICAL FIELD

In various embodiments, the present invention relates generally to safety operation in robots, in particular in collaborative robots that work with human workers.

BACKGROUND

Robots have been deployed across numerous industrial and manufacturing environments to promote reliability and cost savings. Increasingly, they work in the vicinity of human workers; for example, the robot may be required to work collaboratively with humans to perform a task, or the human may enter the robot's workspace by mistake. This can be extremely dangerous, especially if the robot is heavy and moves at a high speed, which is often the case. Conventionally, safety during robot operation is achieved by caging or otherwise safeguarding robots so that humans cannot approach them and, if they do, to ensure that the robots stop in a failsafe manner before a human can get within reach. Recently, safety has been enforced by limiting the inherent capabilities of the robot. A robot may be designed for a particular capability in terms of, for example, its dexterity, force, speed, precision, repeatability, and/or payload capacity; but the flexibility to select optimal parameters may be limited by safety requirements, particularly for robots operating in proximity to humans. Such constraints can make it challenging to achieve safe robot operation relying merely on the inherent robot design.

One alternative to limiting the robot's inherent capabilities is to utilize a safety-rated monitoring system that monitors robotic function and detects any variation therein beyond an allowable limit. For example, the safety-rated monitoring system may continuously monitor the moving speed of a robotic arm; when the detected speed is beyond the allowable limit (which may be context-specific, i.e., lower when humans are present or expected), the monitoring system may command the robot to shut down or work at a drastically reduced speed. Safety-rated monitoring systems are expensive and generally require extra sensors and/or circuitry to be implemented in the robot. They also may be complicated to deploy and use.

Consequently, there is a need for an approach to reliably provide safe robot operation while avoiding unnecessary expense and complexity.

SUMMARY

In general, the present invention provides approaches to robot safety that rely on combining off-the-shelf, safety-rated components with inherent robot design limits to achieve robot safety using conventional circuitry. The use of off-the-shelf safety-rated components obviates the need for specialized and complex safety mechanisms. More specifically, in various embodiments, safe robot operation is achieved by utilizing a commercially available safety-rated controller together with power circuitry implemented in the robot for providing various power levels to robotic actuators and ensuring that the power levels are not exceeded at high performance level with in a safety-rated manner. To enforce a desired degree of safety, an allowable power level that may be supplied to a robotic actuator is first determined; in other words, a safety limit is defined in terms of a maximum power (or voltage or current) level, which can be lower than the robot's normal/standard inherent design limits. This approach thus effectively lowers the inherent robot design limits (due to the reduced allowable power levels). Because the power applied to a typical robotic actuator (in particular, for a direct-current (DC) servo motor) directly, and linearly determines the speed at which the actuator operates, limiting the power supplied thereto creates a speed limit for the actuator. As a result, the speed of the robot or an appendage driven by the actuator is restricted as appropriate to the robotic application. Accordingly, in some embodiments, the allowable power level (i.e., the level of applied power, voltage or current, or a combination) is set to limit the force or speed of the robot (or the actuator-associated appendage) to a desired level. The allowable power level may be determined prior to activating the robot based on the inherent robot design and/or a safety-rated controller. For example, an actuator driving a robotic appendage may be initially set to operate at a DC power of 24 V in the absence of a human worker. Based on the task being executed and robotic parameters (e.g., the arm weight) that can affect safety, this operating power is reduced to a predetermined value of, e.g., 8 V for limiting the appendage speed when a person is in the vicinity of the robot. The appendage can be switched back and forth between the full speed and reduced speed as needed, e.g., as determined by the inherent safety mechanism and/or the commercially available safety-rated controller. Accordingly, approaches in the current invention enable the integrated robotic control system to automatically adapt to reduced power levels to ensure safety.

Additionally and/or alternatively, in some embodiments, the safety controller receives input from which it derives an allowable power level; for example, the input may be an explicit limit on the allowable force or speed entered via, e.g., a user interface, or may be determined based on information about the robot's surroundings obtained by one or more sensors implemented on the robot and/or around the robot. In one implementation, the safety controller also includes a user authentication mechanism (e.g., a password, a unique identifier such as a radio-frequency identification card or a fingerprint) to ensure that only authorized users can access the user interface. The determined power level is communicated to a robot controller (i.e., a microcontroller), which regulates the power circuitry to provide an operating power, voltage and/or current compliant with the allowable power level to the actuator. In other embodiments, the safety controller directly controls the power circuitry to limit the power supplied to the actuator in accordance with the allowable level and enforces it; the safety controller only notifies the robot controller of changes such that the robot controller automatically adjusts its internal setting to be consistent with the new power level. Additionally, the power circuitry may also be safety-rated (i.e., self-monitoring and redundant) to guarantee that the power level is always maintained at an appropriate level based on a safety-rated I/O input, thereby acting as a combination of the safety controller and power supply.

Alternatively, the safety controller may simply collect information regarding the allowable force or speed and transmit the information to the robot controller; the robot controller then determines the allowable power level and regulates the robot actuators based thereon. The safety controller may monitor the actual force or speed of the robotic appendage in real time, enforce the allowable limits, and cut power to the appendage if necessary. Additionally or alternatively, a feedback system that is safety-rated with an equivalent performance level as the safety controller may detect the actuator's actual operating power in real time and transmit the detected information to the safety controller. Failure of an actuator to reach and/or maintain an operating power within the allowable level within a predetermined time, or a level exceeding the allowed maximum, indicates a potentially dangerous operating condition and the safety controller (or the robot controller) may trigger safety contactors to open and thereby cut power to the problematic actuator or to all actuators. Accordingly, the current invention provides an easily implemented and inexpensive way to achieve safe robot operation by simply combining an off-the-shelf safety controller (and, in some embodiments, power circuitry and safety-rated sensors) into and/or around an existing robot without the need for specialized safety circuitry.

Accordingly, in one aspect, the invention pertains to a robot including a body, one or more appendages attached to the body and movable with respect thereto, one or more actuators driving the appendage(s); power circuitry for supplying power to the actuator(s); a safety system configured to (i) receive a safety condition associated with the appendage(s) and (ii) based at least in part thereon, determine an allowable power level of the actuator(s); a control unit configured to regulate the power circuitry based on the determined allowable power level; and a feedback system for (i) monitoring an actual operating power of the actuator(s), and (ii) causing the safety system to disable operation of the robot if the actual operating power exceeds the allowable power level or does not reach the allowable power level on a steady-state basis within a predetermined time interval. In one implementation, the allowable power level is sufficient to operate the actuator(s) but limiting an operating speed thereof. The safety condition includes an allowable speed of the appendage(s) and/or an allowable force that the appendage(s) may apply. In addition, the robot may include a user interface for receiving, and transmitting, to the safety system, the allowable force and/or allowable speed associated with the appendage(s).

In one embodiment, the power circuitry includes a variable power supply. The robot may also include a sensor system for detecting objects within the robot's environment; the safety system receives detection signals from the sensor signals and responsively determines the allowable power level of the actuator(s). The sensor system may include a sonar sensor, an optical range sensor, a camera, a microphone and/or a pressure-sensitive mat.

In various embodiments, the safety system is further configured to receive, from the control unit, parameters associated with the appendage(s) and the actuator(s) and, based thereon, to determine the allowable power level of the actuator(s). Additionally, the safety system may be configured to receive a new safety condition associated with the appendage(s) after the robot is confirmed to operate safely.

In another aspect, the invention relates to a method for safely operating a robot having one or more movable appendages and one or more actuators driving the appendage(s). In various embodiments, the method includes receiving a safety condition associated with the appendage(s); computationally determining an allowable power level of the actuator(s) based at least in part on the received allowable moving parameter; regulating power supplied to the actuator(s) based on the determined allowable power level; monitoring an actual operating power of the actuator(s); and disabling operation of the robot if the actual operating power exceeds the allowable power level or does not reach the allowable power level on a steady-state basis within a predetermined time interval. In one implementation, the allowable power level is sufficient to operate the actuator(s) but while limiting its operating speed.

The safety condition may include an allowable force and/or an allowable speed associated with the appendage(s) when the appendage(s) is in contact with an object. In addition, the method may include detecting objects within the robot's environment and determining the allowable power level of the actuator(s) based at least in part on the detection. Further, the method may include receiving a safety condition associated with the appendage(s) after the robot is confirmed to operate safely. In some embodiments, the method further includes receiving parameters associated with the appendage(s) and the actuator(s) and, based thereon, determining the allowable power level of the actuator(s).

Another aspect of the invention relates to a robot including a body, one or more appendages attached to the body and movable with respect thereto; one or more actuators driving the appendage(s); power circuitry for supplying a power to the actuator(s); a safety system configured to receive a safety condition associated with the appendage(s); and a control unit configured to (i) receive the safety condition from the safety system, (ii) based at least in part thereon, determine an allowable power level of the actuator(s), and (iii) regulate the power circuitry based on the determined allowable power level. The power circuitry may include a variable power supply. In one embodiment, the robot includes a feedback system for monitoring an actual operating power of the actuator(s).

As used herein, the term "substantially" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
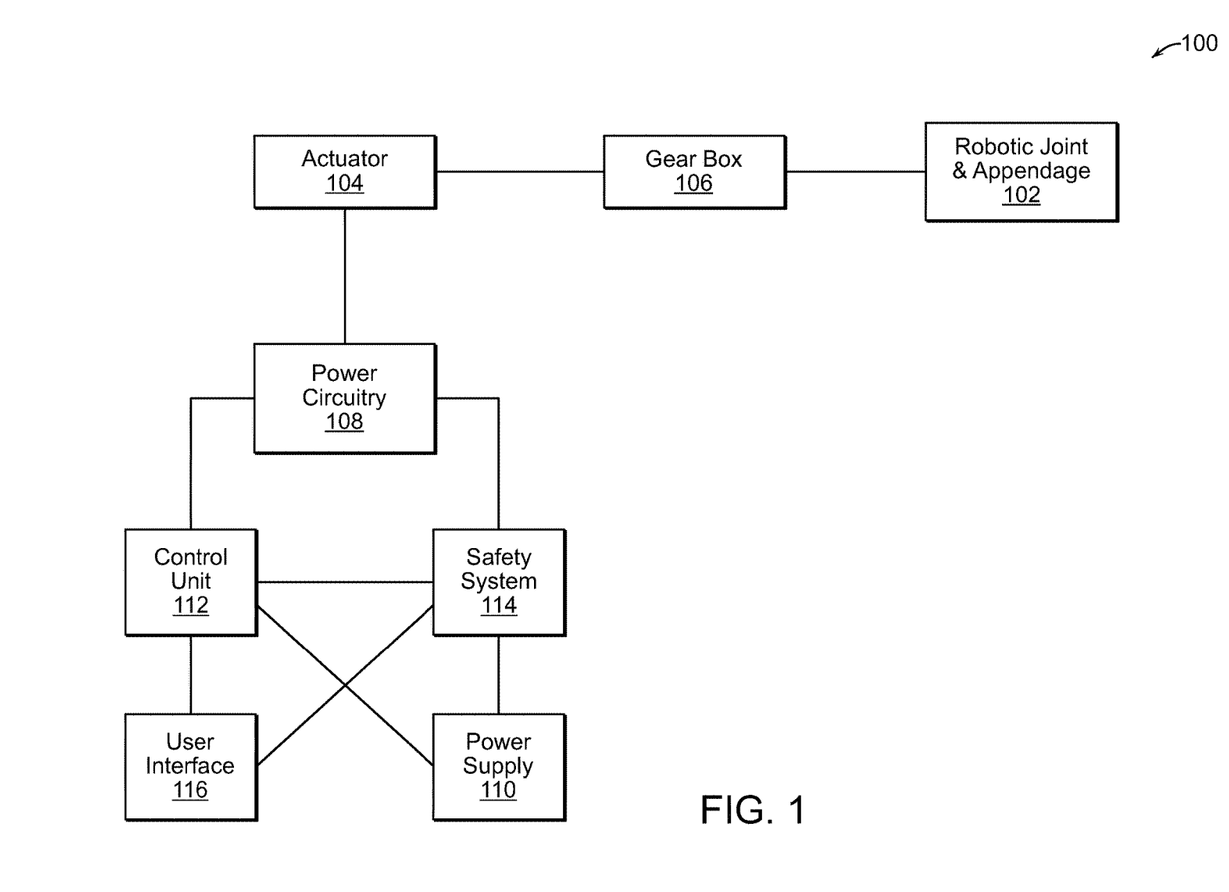
FIG. 1 schematically illustrates a robot integrated with a safety-rated system in accordance with various embodiments.

Refer first to FIG. 1, which illustrates a robotic system 100 having a one or more robotic appendage(s) 102 attached to a robotic body, a surface, or a pedestal; each appendage usually (but not necessarily) includes multiple links connected via movable joints (such as hinges or rotary joints) and an end-effector (such as parallel dual-finger grippers, suction cup grippers, or multi-fingered dexterous hands) for manipulating and moving objects or performing other useful work. The appendage 102 is driven by a robotic actuator 104 via a gearbox 106. Rotation of the actuator 104 generates low-friction motion in the gearbox 106 and is converted into a desired movement of the robotic appendage 102 for performing physical manipulations. The actuator 104 may be, for example, a DC PM motor (such as a three-phase brushless DC motor). In various embodiments, the actuator 104 is actuated by power circuitry 108 that is supported by a power supply 110 and regulated by a robotic control unit (i.e., a microcontroller) 112. The power supply 110 converts AC power (e.g., 110 or 220 AC volts) to DC power and the control unit 112 governs the power supplied to the actuator 104 and, thereby, the speed and direction of the actuator rotation to control various degrees of robotic appendage motional freedom while performing robotic actions. In various embodiments, the robotic system 100 includes a safety system 114 for providing safe robot operation. The safety system 114 includes or consists of, for example, a commercially available, off-the-shelf, safety-rated controller that can determine an allowable power level (e.g., an allowable power, voltage and/or current level) supplied to the actuator 104 and transmit the information to the controller unit 112, which then regulates the power circuitry 108 to restrict the operating power to the allowable level. Alternatively, the safety system 114 may directly control the power circuitry 108 to limit the power supplied to the actuator based on the allowable power level and enforce the limit. In addition, the power circuitry 108 may be safety-rated (i.e., self-monitoring and redundant) to guarantee that the power level is always maintained at an appropriate level based on a safety-rated I/O input, thereby acting as a combination of the safety system 114 and power supply 110. Because the power supplied to the actuator 104 determines its maximum potential speed, limiting the power supplied to the actuator 104 creates a speed limit for the actuator 104, and as such, limits the speed of the robotic joint and appendage 102 driven by the actuator 104; this thereby limits the maximum energy imparted by the appendage on contact with an object (or the maximum force applied by the appendage on the object). Accordingly, safe robot operation is achieved without the need to modify the robotic circuitry. In various embodiments, the robotic system 100 further includes a user interface 116 that allows a user to provide the allowable speed level or force applied by the robotic appendage 102 when it makes contact with the human. The user interface 116 may include, for example, a touchscreen with buttons, dials, and a keypad. In addition, the safety controller may further include a user authentication mechanism (e.g., a password, a unique identifier such as a radio-frequency identification card or a fingerprint) to ensure that only authorized users can access the user interface to change the allowable speed or force.

Figure 2:
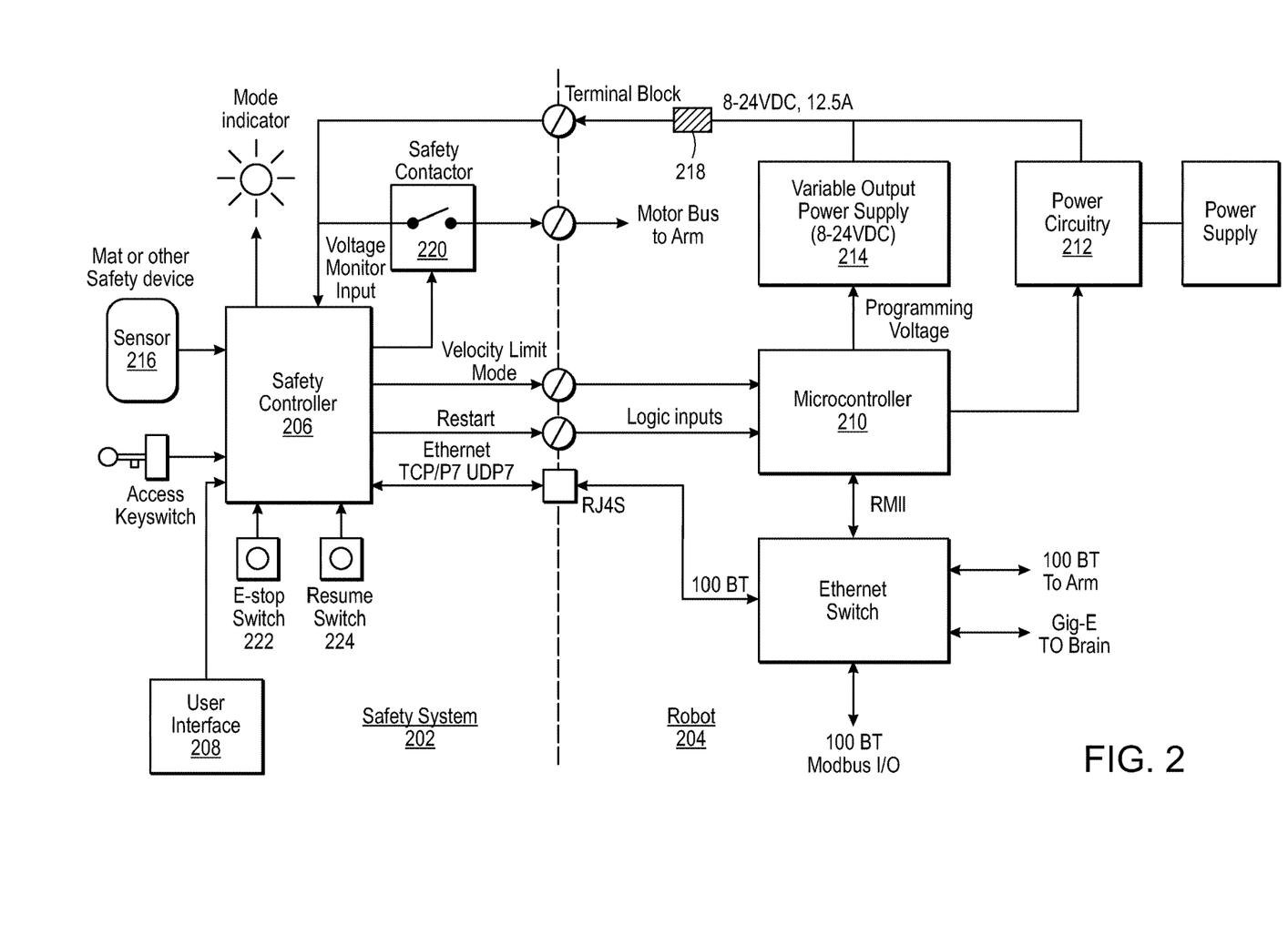
FIG. 2 schematically depicts parts of robot circuitry and safety-rated system in accordance with various embodiments.

As shown in FIG. 2, the safety system 202 works cooperatively with the inherent safety-design mechanism of the robot 204 to provide safe robot operation. In one embodiment, when a conventional safety controller 206 receives information about the allowable force or speed of the robotic appendage from a user interface 208, the safety controller 206 retrieves relevant robotic information (e.g., the weight or length of the appendage and/or the type of the actuator associated with the appendage) from the robotic control unit 210 and, based on this information, determines the allowable power level of the actuator. Data corresponding to the determined allowable power level is transmitted to the robotic control unit 210, which responsively regulates the power circuitry 212 to supply operating power whose maximum power, voltage and/or current does not exceed the allowable level. Alternatively or additionally, a variable power supply 214 may be used to provide various levels of power to the actuator. The variable power supply 214 may be a part of the power circuitry 212 (and thus a part of the robotic inherent safety-design mechanism) or an off-the-shelf, safety-rated component that can be integrated with the robot. The robotic control unit 210 may directly regulate the variable power supply 214, based on the allowable power level received from the safety controller 206, to provide an allowable operating power to the actuator.

Alternatively, the safety controller 206 may collect information about the allowable force or speed level of the robotic appendage from the user interface 208, and communicate the collected information to the robotic control unit 210. Upon receiving the allowable force or speed level, the control unit 210 retrieves relevant robotic information (e.g., the weight or length of the appendage and/or the type of the appendage-associated actuator) stored therein (or stored in a memory internal and/or external to the robot) and computes the allowable power level based on the received and retrieved information. This approach may advantageously save processing time in determining the allowable power level of the actuator.

Figure 3A:
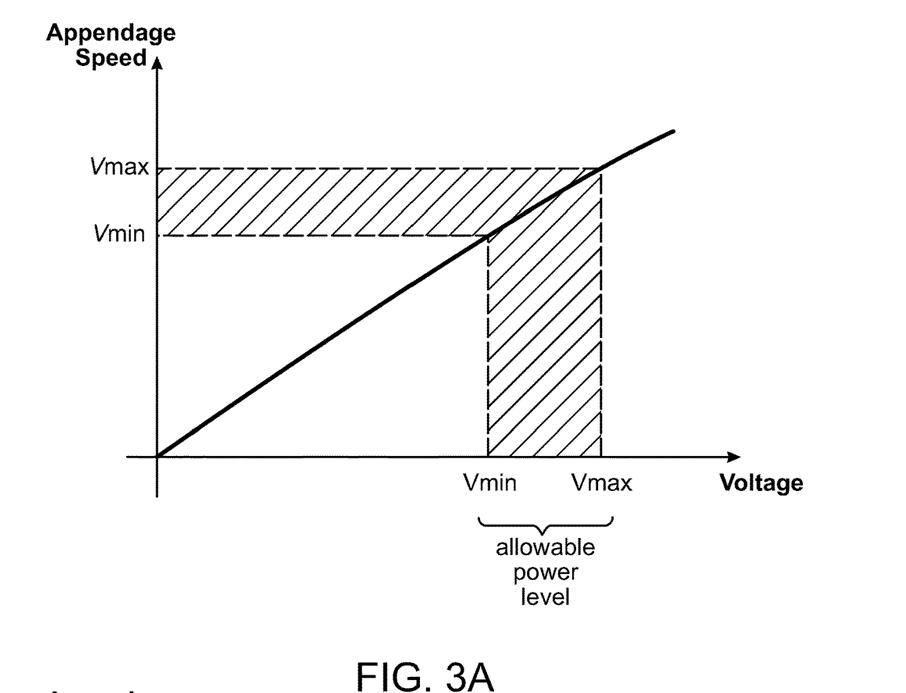
FIG. 3A schematically illustrates a relationship between a power supplied to a robotic actuator and a speed of a robotic appendage driven by the actuator in accordance with various embodiments.
Figure 3B:
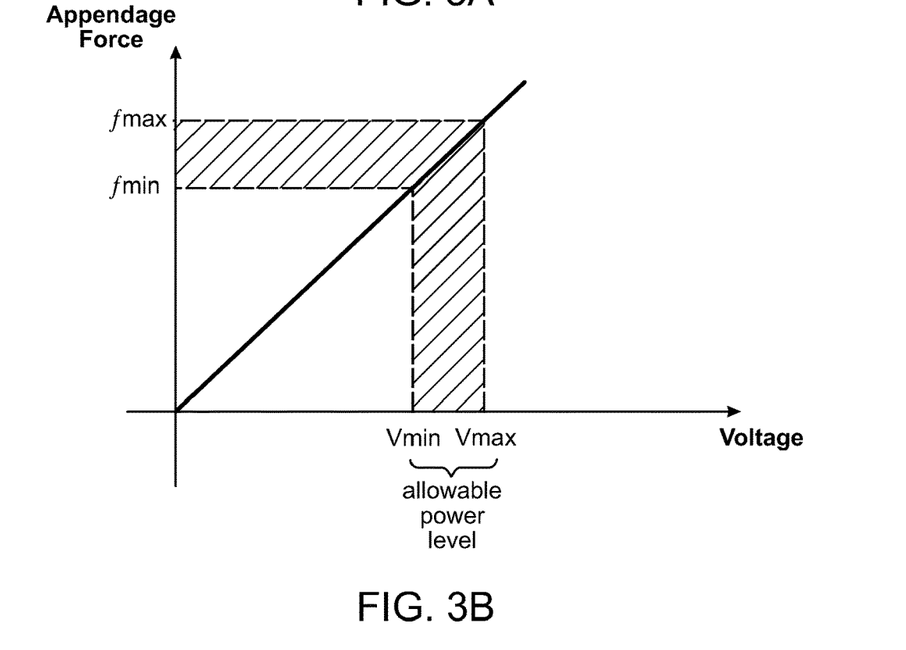
FIG. 3B schematically illustrates a relationship between a power supplied to a robotic actuator and a force applied by a robotic appendage driven by the actuator in accordance with various embodiments.

With reference to FIG. 3A, the operating power (e.g., voltage) supplied to the robotic actuator may positively correlate to the speed of the robotic appendage that is driven by the actuator. Thus, limiting the power supplied to the actuator within an allowable range (i.e., between $V_{min}$ and $V_{max}$) also limits the speed of the appendage (i.e., between $v_{min}$ and $v_{max}$). Because the speed of appendage in the allowable range is fast enough (i.e., above $v_{min}$) to allow the robot to perform its task without causing harm to the human worker (i.e., below $v_{max}$) when being in contact, this approach provides safe robot operation while at the same time maintaining the robot's efficiency. FIG. 3B illustrates how the operating power (e.g., voltage) supplied to the robotic actuator may positively correlate to the force generated by the appendage movement. Similarly, limiting the power supplied to the actuator within an allowable range (i.e., between $V_{min}$ and $V_{max}$) may also limit the force that would be applied by the appendage to a human worker (i.e., between $f_{min}$ and $f_{max}$) to ensure the robot's safety and efficiency.

The allowable force or speed level of the appendage may depend on the robotic applications, the robot's environments, etc. In some embodiments, the safety system 202 further combines with (or in some embodiments, the safety system itself includes) one or more sensors 216 for monitoring the space around the robot and detecting, e.g., people approaching the robot as noted above. The sensors 216 may include, for example, sonar sensors, optical range sensors, one or more video cameras (preferably with depth-sensing capabilities and operating, e.g., in the visible or infrared regime), microphones (e.g., for detecting people based on characteristic sound patterns), occupancy sensors, and/or pressure-sensitive mats. For example, a pressure-sensitive mat 216 may be laid on the floor surrounding the robot. When an object makes contact with the mat 216, the mat 216 may transmit a detected weight and movement parameters to the safety controller 206; the safety controller 206 may then determine whether the object is a human and, based on this determination, select the allowable power level. In some embodiments, the safety controller 206 is configured to detect a plurality of object types (e.g., humans, other robots, machinery) based on weight and movement, and to base the allowable power level on the identified object type. Again, information about the determined allowable power level may be transmitted to the robotic control unit 210 to regulate the power supplied to the actuator accordingly.

In various embodiments, the allowable power level to the actuator is determined based on the sensor signals in conjunction with the user input. For example, the spatial zone monitored by the sensor 216 may be classified into two zones—a safe working zone that begins a threshold distance away from the robot and a dangerous working zone extending from the robot to the threshold distance. The controller 210 may store, in a memory, predetermined default values for two allowable speed levels of the robotic appendage—a higher speed (or force) level if no humans or vulnerable objects are detected within the dangerous working zone and a lower allowable speed (or force) level upon entry of a person or object into the dangerous working zone. These default values may be modified via the user interface 208. When, for example, the sensor 216 detects that the object moves from the normal working zone into the dangerous working zone, the sensor 216 communicates this information to the safety controller 206; the safety controller 206 consequently adjusts the allowable power level supplied to the actuator from the higher power level to the lower power level and communicates this adjustment to the robotic control unit 210, and the robotic control unit 210 regulates the power to the actuator accordingly. Again, the safety controller 206 may alternatively transmit the information regarding movement detection to the robotic control unit 210, which then determines and adjusts the actuator power level to cause the appendage to reduce the force or speed to the lower level set by the user for ensuring safety.

In various embodiments, the allowable power level supplied to the actuator is adjusted back to the higher power level upon detecting an exit of the person or object out of the dangerous working zone. Because the two allowable power levels of the actuator and/or the speed levels of the robotic appendage may be predetermined values stored in a memory associated with the robot, the safety controller 206 may simply switch the robotic appendage back and forth between the full speed and reduced speed based on the sensor signals.

The threshold distance may be defined based on practical considerations concerning safety risks, which may be specific to the application—i.e., the type of robot, the type of tasks it carries out, and the environment in which it operates. For example, in some embodiments, the dangerous working zone is co-extensive with a spatial region around (and co-moving with) the robot in which collisions can occur; the outer limits of this region generally correspond to the reach of the robot's appendages (or other movable parts). The depth of the dangerous working zone may depend on the robot's overall speed of motion. As will be readily appreciated by persons of skill in the art, the dangerous working zone may be defined in many different ways. In addition, after the operating power of the actuator is reduced, the appendage may need some time to decelerate from a high speed to a new allowable speed. Thus, in one embodiment, the area or distance detectable by the sensor 216 is large enough to allow for earlier detection of human approach—i.e., the appendage has reached its reduced speed before the approaching person gets within reach of the robot.

Under normal operation, the actuator can reach and be stable at an operating power defined by the control unit within a short period of time (e.g., within 1 or 2 seconds). Referring again to FIG. 2, in various embodiments, the actual operating power of the actuator and/or actual force or speed of the robot (or the actuator-associated appendage) is monitored in real time by a feedback system 218, including, for example, an existing voltage or current sensor in the safety controller 206 and/or the robotic control unit 210 (and all components having the appropriate functional safety performance level and responsibility for monitoring power are desirably self-monitoring and redundant). Failure of the actuator's actual operating power (and/or the appendage's force or speed) to reach and/or maintain stability at the defined level within a predetermined time indicates a significant, potentially safety-threating operating anomaly; the same is true if the operating power (and/or the appendage's force or speed) exceeds the defined power level. Upon detecting this condition, the safety controller 206 may trigger safety contactors 220 to open and thereby cut power to the robot actuator and/or alert the human worker via, e.g., the user interface 208 or other modality. Alternatively, the robotic control unit 210 may directly shut down the robot via the robotic inherent safety-design mechanism when receiving the error signal.

The safety system 202 may be combined with various types of safety-rated approaches. For example, it may support commonly used methods for providing safeguards, such as emergency circuitry (e.g., e-stop buttons), access keyswitches, light curtains, etc. In one embodiment, the safety controller 206 connects to a safety-rated e-stop switch 222 and a resume switch 224. When the e-stop switch 222 is pressed during an emergency, the safety controller 206 cuts the power supplied to the actuator via the use of the safety contactors 220. Additionally, the robotic control unit 210 may be notified by the safety controller 206 or separately detect the emergency stop state and respond accordingly (e.g., halting the program and commanding the actuator associated controller to effectively turn off the actuator until the program is resumed or restarted). The power is then kept off until the emergency is relieved. To resume robot operation, the e-stop switch 222 may be first released (by twisting the button, or some other manual method), followed by pressing the resume switch 224; a third button or other interface method (such as a teaching pendant) may be activated to inform the robot controller 210 to restart or continue normal operation.

In various embodiments, the power supplied to the actuator can be adjusted only after the current operating power of the actuator reaches and maintains stability within the determined allowable power level; this ensures normal and safe operation of the robot. To accomplish this, in one embodiment, after the safety controller 206 transmits the allowable force or speed of the appendage or the allowable power level of the actuator to the control unit 210, the safety controller 206 stops receiving new user input from the user interface 208 and/or new detection signals from the sensor 216 (or in some embodiments, it receives the data but does not process them) until it receives a confirmation signal from the feedback system 218 indicating that the actual operating power of the actuator reaches and is stable at the determined power level. Once the confirmation signal is received, the safety controller 206 starts to receive and/or process the new user input and/or detection signal to determine a new allowable power level to the actuator.

Figure 4:
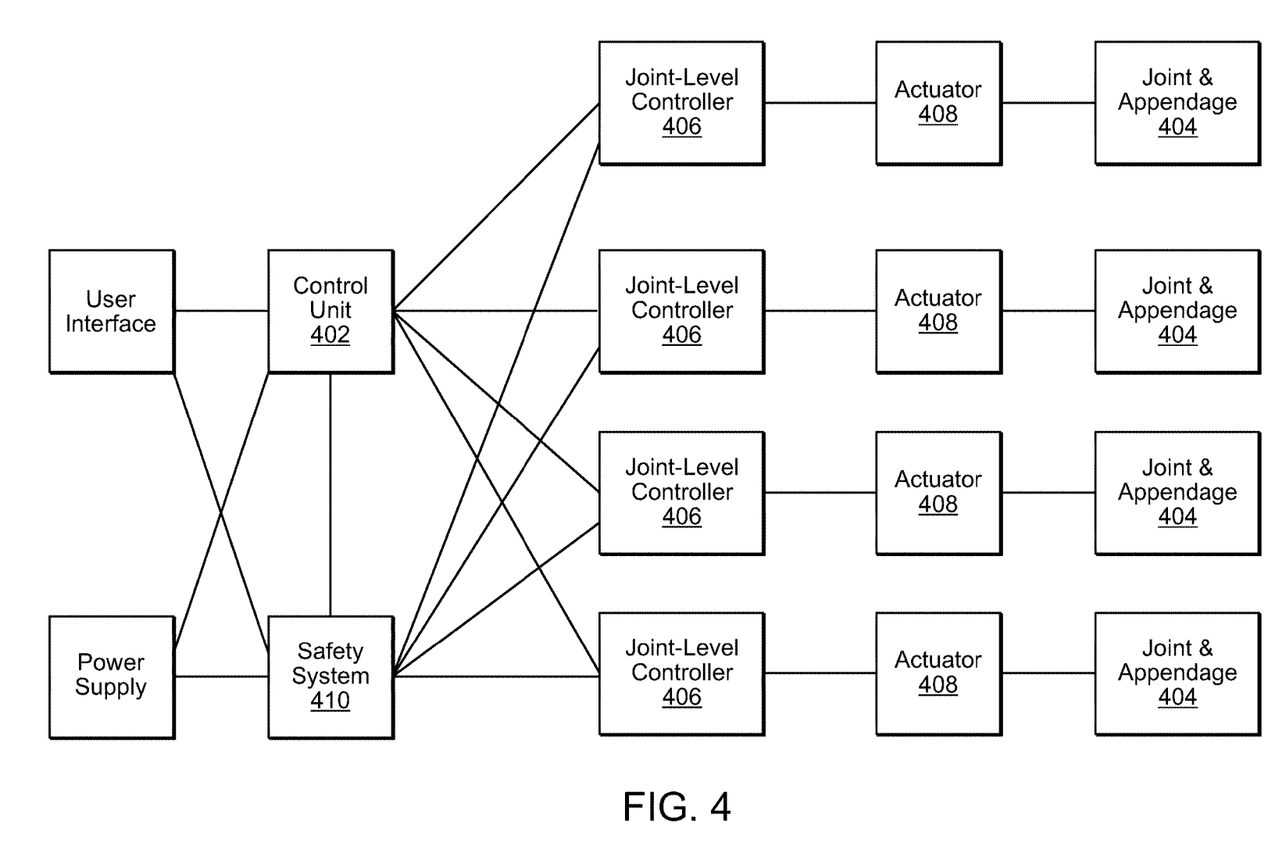
FIG. 4 schematically illustrates a safety-rated system integrated with multiple robotic appendages in accordance with various embodiments.

Referring to FIG. 4, the robotic control unit 402 may simultaneously and/or sequentially control movements of multiple appendages 404 directly or via the use of multiple joint-level controllers 406. The joint-level controllers 406 may be in communication with and accept commands from the high-level control unit 402 to drive the individual actuators 408 and the actuator-associated appendages 404 and/or other moving parts of the robot as directed. In various embodiments, a safety system 410, including the safety controller as described above, is integrated with the control unit 402. The force and/or speed applied by each appendage 404 can be separately pre-set, e.g., by the user, to provide safe robot operation. The safety controller 410 communicates with the control unit 402 and/or joint-level controllers 406 to retrieve relevant robotic information (e.g., the weight or length of each appendage and/or the type of the actuator) and computes an allowable operating power level of each appendage-associated actuator 408 based on the retrieved information and the pre-set allowable force or speed. The safety controller 410 then communicates the allowable power level to the control unit 402 and/or joint-level controllers 406 to regulate the power supplied to the actuators 408 accordingly. Alternatively, the safety controller 410 may transmit the pre-set allowable force or speed for each appendage to the associated joint-level controller 406 and/or the control unit 402, which then determines the allowable operating power of the associated actuator 404 and regulates it based thereon. Because the allowable force or speed of each appendage may be the same or different, the power supplied to each actuator associated with the appendage may be the same or different. In fact, because the appendages may have different weights, lengths, and/or other relevant parameters, even if the pre-set safe level of the force or speed of the appendages 402 is the same, the allowable operating power of the associated actuator 408 may be the same or different. Additionally, the safety system 410 may include one or more sensors on each appendage to detect the appendage's environment as described above. The detected information may be used in conjunction with the pre-set allowable forces or speeds of the appendages to regulate the power supplied to their associated actuators.

Figure 5A:
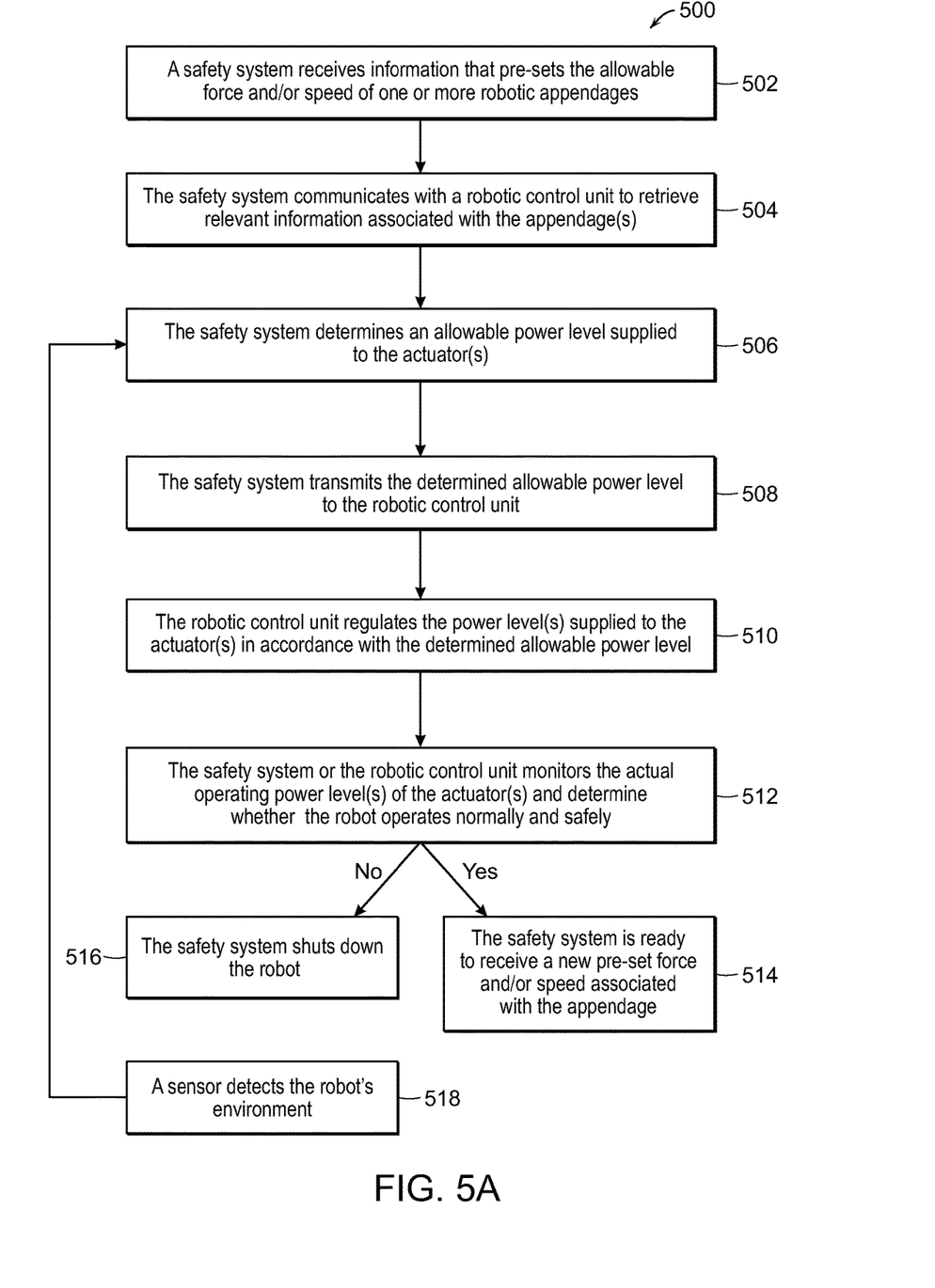
FIG. 5A-5C are flow charts illustrating methods for providing safe robot operation in accordance with various embodiments.

FIG. 5A depicts an approach 500 for providing safe robot operation using a safety system in combination with the inherent safety-design mechanism of the robot in accordance with various embodiments of the current invention. In a first step 502, the safety system receives information from, for example, a user interface that pre-sets the allowable force and/or speed of one or more robotic appendages when in contact with an object. In a second step 504, the safety system communicates with a robotic control unit to retrieve relevant information associated with the appendage(s), and/or the appendage-associated actuator(s). In a third step 506, the safety system determines an allowable power level supplied to the actuator(s) based on the information received in steps 502 and 504. In a fourth step 508, the safety system transmits the determined allowable power level to the robotic control unit. In a fifth step 510, the robotic control unit regulates the power level(s) supplied to the actuator(s) in accordance with the determined allowable power level. In a sixth step 512, the safety system or the robotic control unit monitors the actual operating power level(s) of the actuator(s) via the use of a feedback system (e.g., a voltage sensor), and determines whether the robot is operating normally and safely. If so, the safety system is ready to receive a new pre-set force and/or speed associated with the appendage, if the new value is necessary to ensure safe operation (in a step 514). If not, the safety system shuts down the robot (in a step 516). Optionally, the safety system may receive information from a sensor detecting the robot's environment (step 518) and adjust the allowable power level supplied to the actuator(s) based on the sensed information.

Figure 5B:
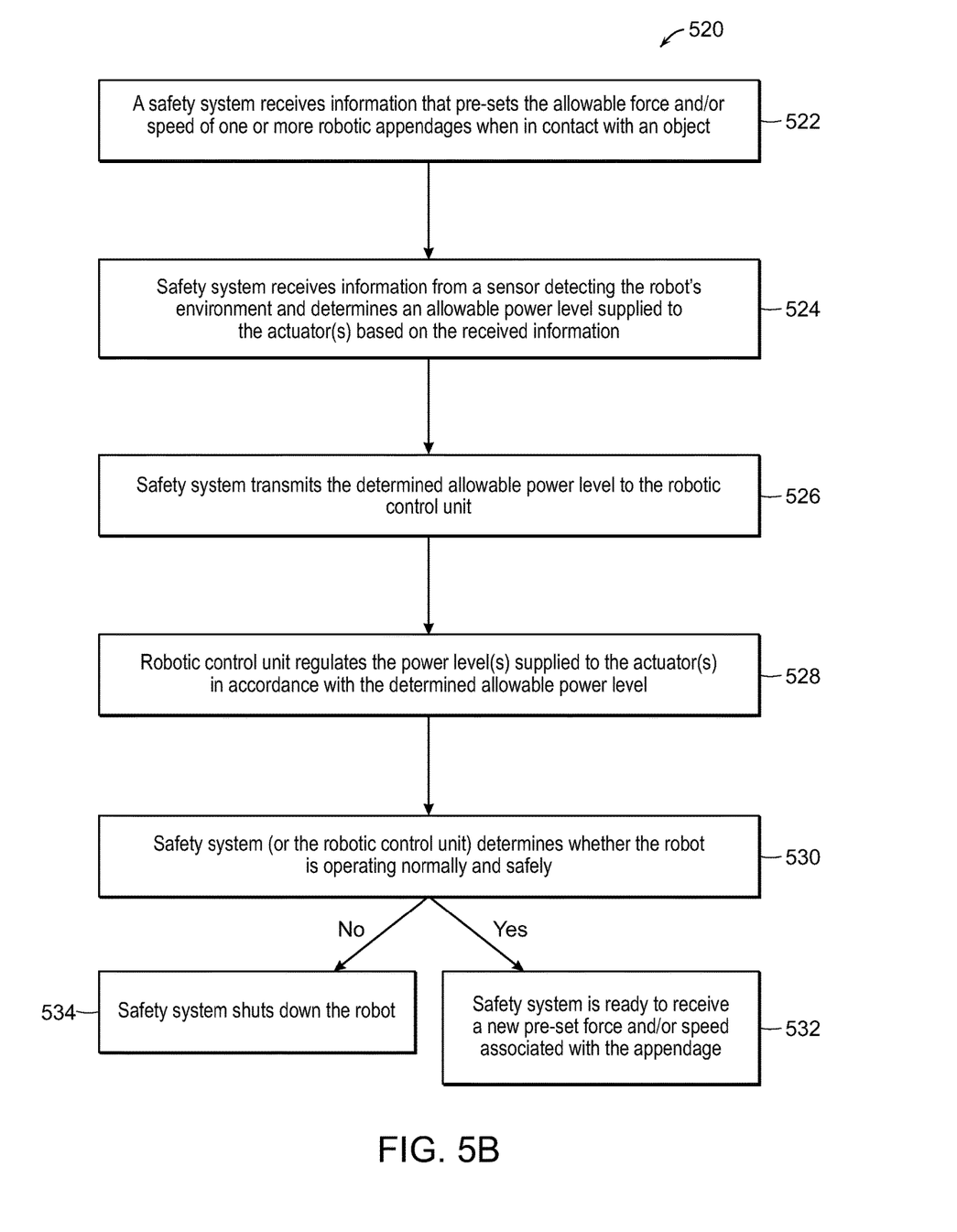

FIG. 5B depicts another approach 520 for providing safe robot operation using a safety system in combination with the inherent safety-design mechanism of the robot in accordance with various embodiments of the current invention. In a first step 522, the safety system receives information from, for example, a user interface that pre-sets the allowable force and/or speed of one or more robotic appendages when in contact with an object. In a second step 524, the safety system receives information from a sensor detecting the robot's environment and determines an allowable power level supplied to the actuator(s) based on the received information. In a third step 526, the safety system transmits the determined allowable power level to the robotic control unit. In a fourth step 528, the robotic control unit regulates the power level(s) supplied to the actuator(s) in accordance with the determined allowable power level. In a fifth step 530, the safety system (or the robotic control unit) monitors the actual operating power level(s) of the actuator(s) via a feedback system (e.g., a voltage sensor), and determines whether the robot is operating normally and safely. If so, the safety system is ready to receive a new pre-set force and/or speed associated with the appendage (in a step 532). If not, the safety system shuts down the robot (in a step 534).

Figure 5C:
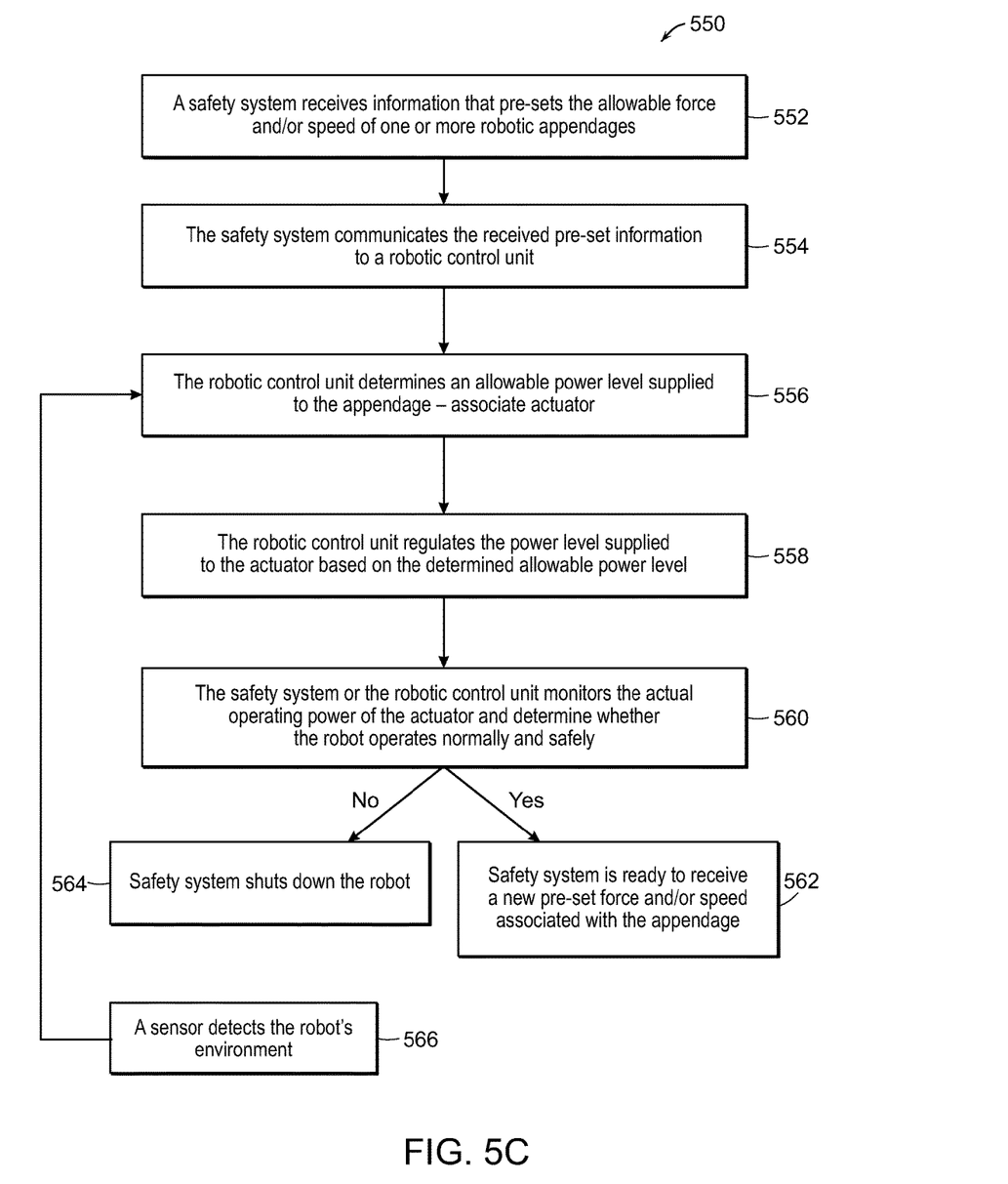

FIG. 5C depicts another approach 550 of providing safe robot operation using a safety system in combination with the inherent safety-design mechanism of the robot in accordance with various embodiments of the current invention. In a first step 552, the safety system receives information that pre-sets the allowable force of impact and/or speed of one or more robotic appendages from, for example, a user interface and/or based on sensor signals. In a second step 554, the safety system communicates the received pre-set information to a robotic control unit. In a third step 556, the robotic control unit or the safety system determines an allowable power level supplied to the appendage-associated actuator based on the pre-set information from the safety system and information associated with the appendage. In a fourth step 558, the robotic control unit regulates the power level supplied to the actuator based on the determined allowable power level. In a fifth step 560, the safety system or the robotic control unit monitors the actual operating power of the actuator via the use of a feedback system (e.g., a voltage sensor) and determines whether the robot is operating normally and safely. If so, the robot continues to operate, and the safety system may be updated with a new pre-set force and/or speed of the appendage if desired (in a step 562). If the robot is not operating normally and safely, the safety system shuts down the robot (in a step 564). Again, the safety system may receive information from a sensor detecting the robot's environment (in a step 566) and communicate the sensed data to the robotic control unit to cause adjustment of the allowable power level supplied to the actuator.

Accordingly, the current invention provides approaches to robot safety by combining a commercial, off-the-shelf, safety system with the inherent safety-design mechanism of the robot. The safety system allows the user to determine an allowable force and/or speed level of the appendage when it contacts an object. The determined values are then used to scale the power supplied to the actuators driving the appendage. Because integrating the safety system with the robot does not require significant modification of the internal robotic design and/or robotic circuitry (for example, the logic voltages associated with the actuators are unaffected and the robotic controller does not have to be safety-rated—a safety-rated controller would require redundancy, extra monitoring functions, safety-rated program code, etc.), the current invention provides an easily implemented and inexpensive way to achieve safe robot operation without complexity that can lead to human errors and consequent risk to workers, thereby allowing the robot to safely share its workspace and/or collaborate with humans.

The robotic control unit 402, joint-level controllers 406, and/or the safety controller 410 may be implemented in hardware, software, or a combination of both. In general, if implemented in software, the robotic control unit 402, joint-level controllers 406, and the safety controller 410 may include various modules that can be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages; in some embodiments, different modules are programmed in different languages. In various embodiments, each of the robotic control unit 402, joint-level controllers 406, and safety controller 410 includes at least a processor and associated memory as well as one or more buses that facilitate communication there between and/or with the sensors, and user interface. For example, each of the robotic control unit 402, joint-level controllers 406, and safety controller 410 may be provided on a general-purpose computer including a CPU, system memory, non-volatile data storage devices, user input/output devices, and optionally interfaces or ports for connection to other devices. Alternatively, each of them may employ any of a variety of other processing devices, including, without limitation, special-purpose computers, microcontrollers, application-specific integrated circuits (ASICs), field-programmable gate arrays (FPGAs), digital signal processors (DSPs), or programmable gate arrays (PGAs). In some embodiments, combinations of multiple different processing devices are used. The robotic control unit 402, joint-level controllers 406, and/or safety controller 410 may be physically embedded into the robot, or remotely communicate with the robot via a wired or wireless connection (e.g., via Ethernet, Bluetooth, WLAN, the Internet, etc.). Furthermore, in some embodiments, the overall control functionality of the robotic control unit 402, joint-level controllers 406, and/or safety controller 410 is distributed between components physically integrated into the robot, and external components in communication with the robot.

While the invention has been described with respect to particular features and embodiments, it will be apparent to those of ordinary skill in the art that other embodiments incorporating the concepts disclosed herein may be used without departing from the spirit and scope of the invention. For example, the robot may include alternative or additional sensors or sensor locations and arrangements than described above for detecting the presence and location of humans. Further, the robot may communicate the detection of persons and its intentions in manners other than those described, including, e.g., by sound. Accordingly, the described embodiments are to be considered in all respects as only illustrative and not restrictive.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A robot comprising:
   a body and, attached thereto, at least one appendage movable with respect thereto;
   at least one actuator driving the at least one appendage;
   power circuitry for supplying power to the at least one actuator;
   a safety system configured to (i) receive a safety condition associated with the at least one appendage and (ii) based at least in part thereon, determine an allowable power level of the at least one actuator, the allowable power level being sufficient to operate the at least one actuator but limiting an operating speed thereof;
   a control unit configured to regulate the power circuitry based on the determined allowable power level; and
   a feedback system for (i) monitoring an actual operating power of the at least one actuator, (ii) determining (a) if the actual operating power exceeds the allowable power level and (b) if the actual operating power does not reach the allowable power level on a steady-state basis within a predetermined time interval, and (iii) causing the safety system to disable operation of the robot when (a) or (b) is determined to occur.

2. The robot of claim 1, wherein the safety condition comprises at least one of an allowable speed of the at least one appendage or an allowable force that the at least one appendage may apply.

3. The robot of claim 2, further comprising a user interface for receiving, and transmitting to the safety system, the allowable force and/or allowable speed associated with the at least one appendage.

4. The robot of claim 1, wherein the power circuitry comprises a variable power supply.

5. The robot of claim 1, further comprising a sensor system for detecting objects within the robot's environment, the safety system receiving detection signals from the sensor signals and responsively determining the allowable power level of the at least one actuator.

6. The robot of claim 5, wherein the sensor system comprises at least one of a sonar sensor, an optical range sensor, a camera, a microphone or a pressure-sensitive mat.

7. The robot of claim 1, wherein the safety system is further configured to receive a new safety condition associated with the at least one appendage after the robot is confirmed to operate safely.

8. The robot of claim 1, wherein the safety system is further configured to receive, from the control unit, parameters associated with the at least one appendage and the at least one actuator and, based thereon, determine the allowable power level of the at least one actuator.

9. The robot of claim 1, wherein the feedback system is not configured to monitor (i) an actual operating speed of the at least one appendage and (ii) an actual operating force applied by the at least one appendage.

* * * * *